United States Patent
Tozzi et al.

(10) Patent No.: US 11,293,556 B2
(45) Date of Patent: *Apr. 5, 2022

(54) AUTOMATIC RING VALVE, SHUTTERS FOR AUTOMATIC RING VALVES, AND METHOD FOR MANUFACTURING SAID SHUTTERS

(71) Applicant: Nuovo Pignone Srl, Florence (IT)

(72) Inventors: Pierluigi Tozzi, Florence (IT); Iacopo Giovannetti, Florence (IT); Alberto Babbini, Florence (IT); Francesco Buffa, Florence (IT)

(73) Assignee: NUOVO PIGNONE SRL, Florence (IT)

( * ) Notice: Subject to any disclaimer, the term of this patent is extended or adjusted under 35 U.S.C. 154(b) by 102 days.

This patent is subject to a terminal disclaimer.

(21) Appl. No.: 15/524,799

(22) PCT Filed: Oct. 23, 2015

(86) PCT No.: PCT/EP2015/074647
§ 371 (c)(1),
(2) Date: May 5, 2017

(87) PCT Pub. No.: WO2016/071128
PCT Pub. Date: May 12, 2016

(65) Prior Publication Data
US 2017/0335979 A1    Nov. 23, 2017

(30) Foreign Application Priority Data

Nov. 5, 2014    (IT) .............................. FI2014A000246

(51) Int. Cl.
*F16K 11/04*      (2006.01)
*F04B 39/10*      (2006.01)
(Continued)

(52) U.S. Cl.
CPC .......... *F16K 11/04* (2013.01); *B29D 99/0085* (2013.01); *F04B 39/102* (2013.01);
(Continued)

(58) Field of Classification Search
CPC .. F16K 11/04; F16K 27/0272; B29D 99/0085
See application file for complete search history.

(56) References Cited

U.S. PATENT DOCUMENTS 4,307,751 A * 12/1981 Mayer ..................... F16K 15/08
                                                                            137/454.4
4,854,341 A      8/1989   Bauer
(Continued)

FOREIGN PATENT DOCUMENTS

EP          1221554 A1      7/2002
WO     2003056176 A1      7/2003
(Continued)

OTHER PUBLICATIONS

Buffa et al., "Automatic Ring Valve Shutters For Automatic Ring Valves And Method For Manufacturing Said Shutters", GE co-pending Application No. FI2013A000243, filed on Oct. 16, 2013.
(Continued)

*Primary Examiner* — Michael R Reid
(74) *Attorney, Agent, or Firm* — Baker Hughes Patent Org.

(57) ABSTRACT

An automatic ring valve 10 comprising a valve seat 12 provided with a plurality of gas flow passages 14 arranged according to at least one annular row, at least a shutter 18 comprising at least one ring-shaped portion for selectively closing and opening the gas flow passages 14, wherein said ring-shaped portion of the shutter 18 comprises a fiber-reinforced matrix 40, at least one contrasting member for contrasting an opening movement of ring-shaped portion of the shutter 18, wherein said ring-shaped portion of the
(Continued)

shutter 18 comprises a structural core 18A made by said fiber-reinforced matrix 40, and wherein at least a portion of said structural core 18A is covered by at least one primary layer 18B, designed to improve fracture and/or impact and/or wear resistance of said ring-shaped portion.

11 Claims, 6 Drawing Sheets

(51) Int. Cl.
*F16K 15/08* (2006.01)
*B29D 99/00* (2010.01)
*F16K 27/02* (2006.01)
*B29K 71/00* (2006.01)
*B29K 81/00* (2006.01)
*B29K 509/08* (2006.01)

(52) U.S. Cl.
CPC .......... *F04B 39/1053* (2013.01); *F16K 15/08* (2013.01); *F16K 27/0272* (2013.01); *B29K 2071/00* (2013.01); *B29K 2081/04* (2013.01); *B29K 2509/08* (2013.01)

(56) References Cited

U.S. PATENT DOCUMENTS

| | | | | |
|---|---|---|---|---|
| 6,164,702 | A  * | 12/2000 | Hauber | B29C 70/32 |
| | | | | 285/131.1 |
| 10,086,571 | B2 * | 10/2018 | Hawley | B29C 70/023 |
| 10,145,480 | B2 * | 12/2018 | Buffa | F16K 15/10 |
| 2003/0085533 | A1 * | 5/2003 | Spiegl | F16K 15/10 |
| | | | | 277/650 |

FOREIGN PATENT DOCUMENTS

| | | |
|---|---|---|
| WO | 2013087615 A1 | 6/2013 |
| WO | 2013131976 A1 | 9/2013 |

OTHER PUBLICATIONS

Italian Search Report and Written Opinion issued in connection with corresponding IT Application No. FI2014A000246 dated Jul. 22, 2015.

International Search Report and Written Opinion issued in connection with corresponding PCT Application No. PCT/EP2015/074647 dated Jan. 8, 2016.

"Victrex Peek Polymers", The Foundation of Victrex Innovation, pp. 1-4, 2017.

* cited by examiner

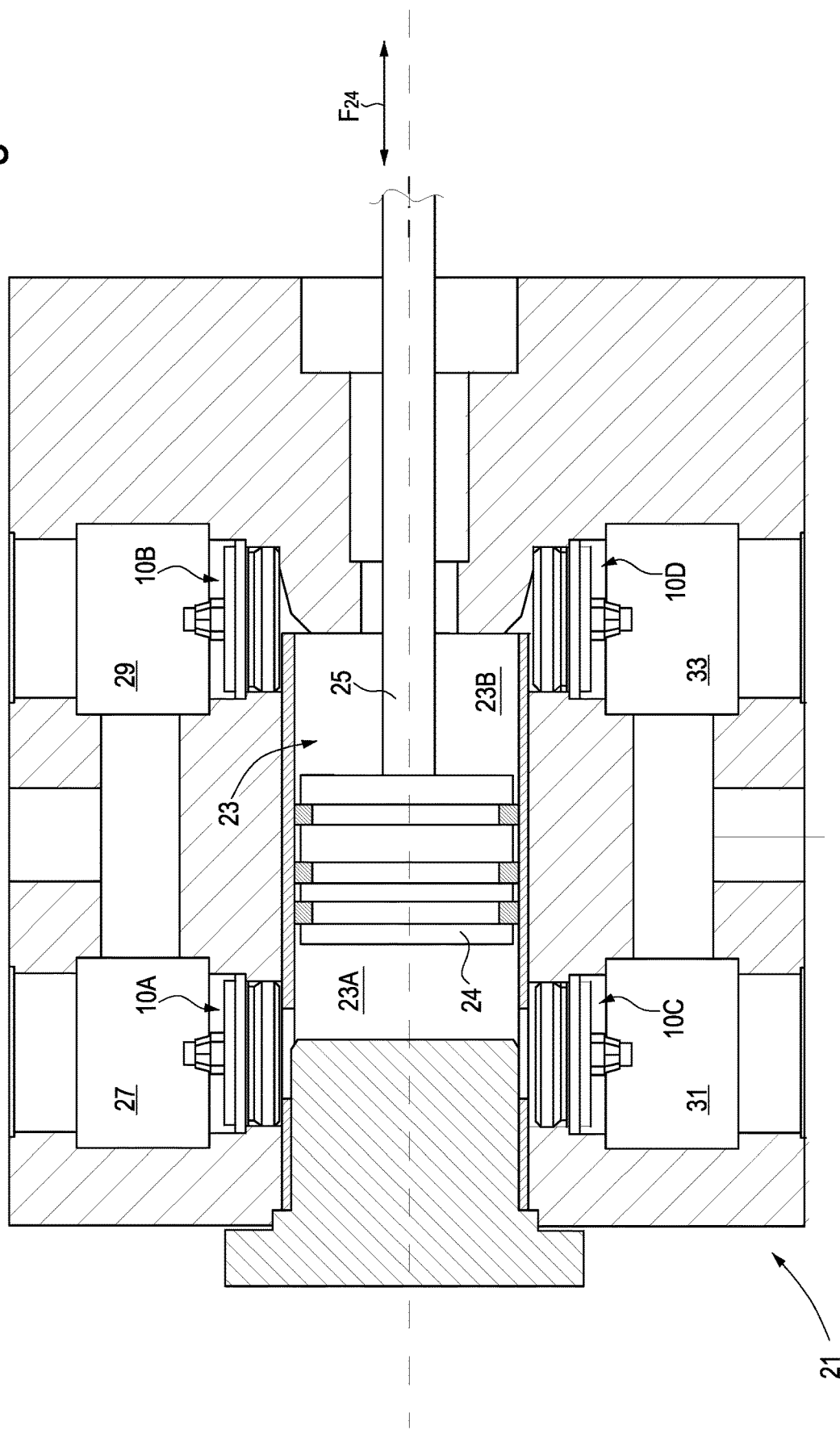

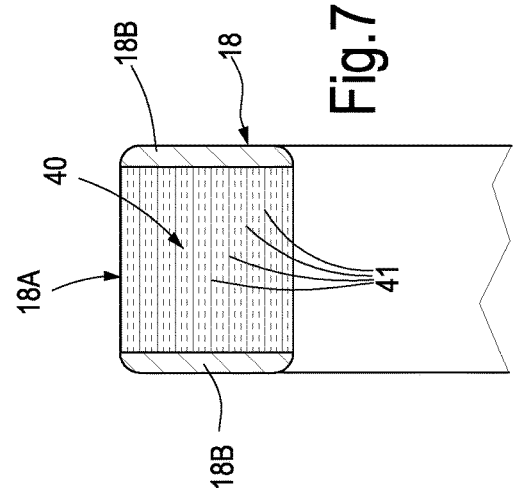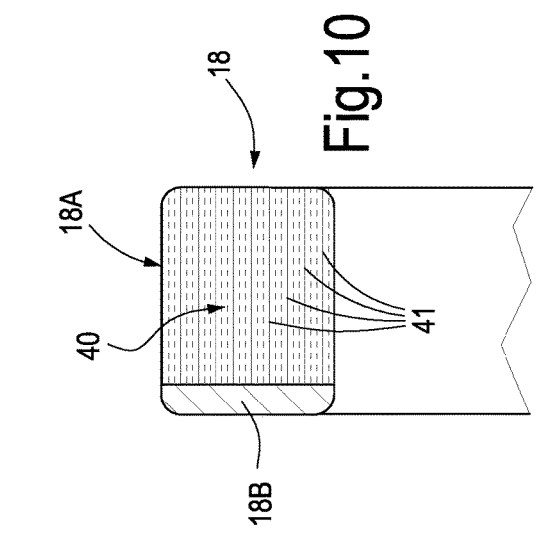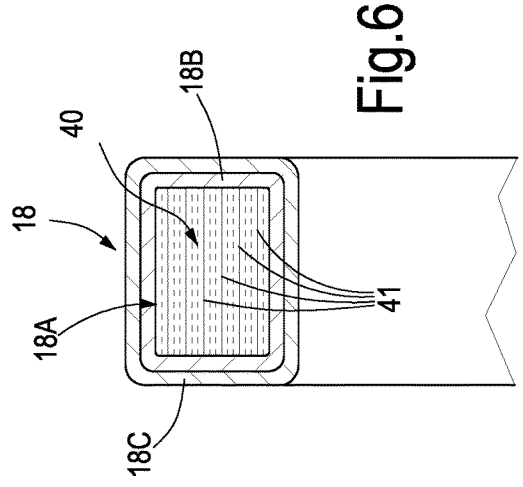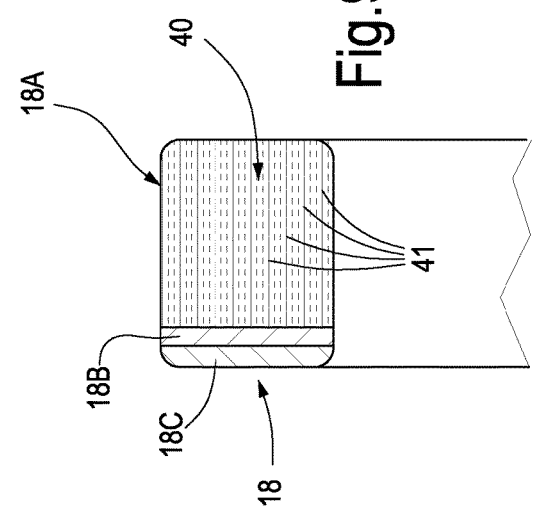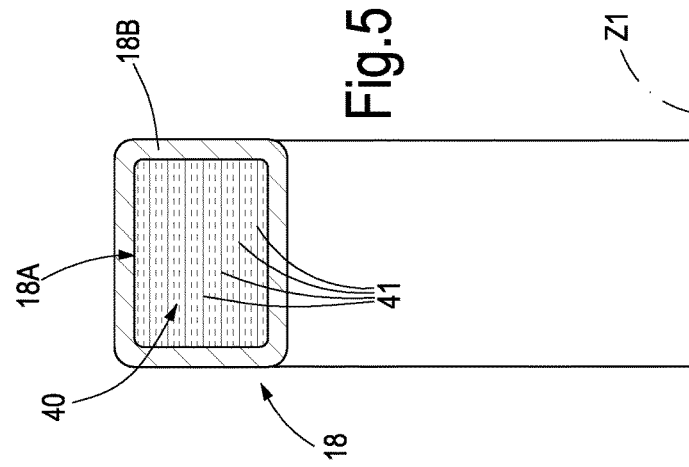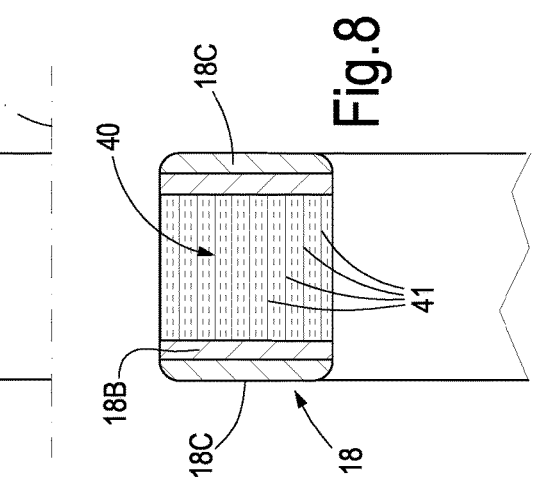

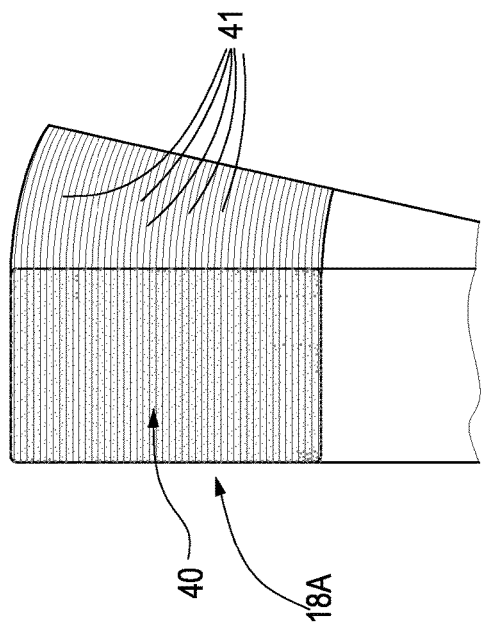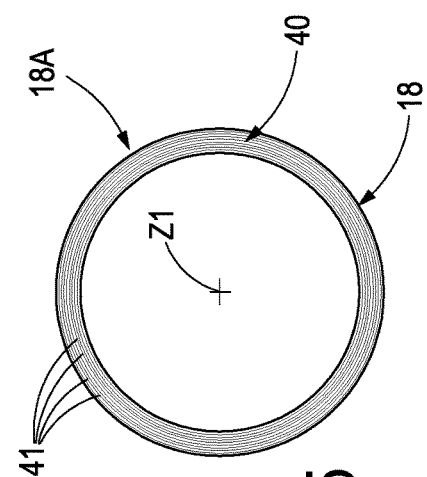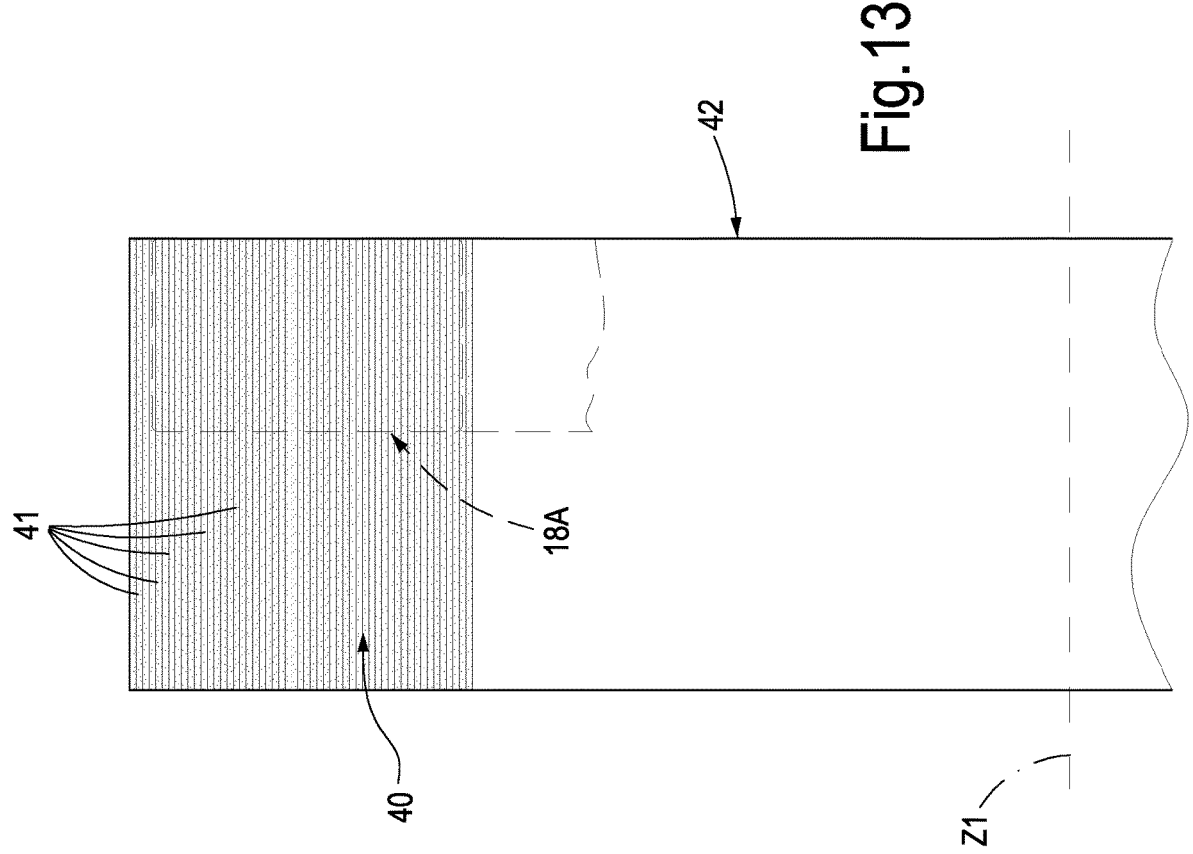

AUTOMATIC RING VALVE, SHUTTERS FOR AUTOMATIC RING VALVES, AND METHOD FOR MANUFACTURING SAID SHUTTERS

BACKGROUND

Automatic valves are commonly used for example in reciprocating compressors. Automatic valves are arranged on both the suction side as well as the discharge side of the compressor, to automatically open and close the suction port and discharge port of the compressor under the control of the pressure inside the compressor cylinder.

As know, an automatic ring valve can comprise a valve guard and a valve seat, the latter provided with circumferentially arranged gas flow passages extending through the valve seat. Also the valve guard is provided with gas flow passages. A plurality of concentrically arranged shutter rings are placed between the valve seat and the valve guard. Each shutter ring is arranged along a set of corresponding annularly arranged gas flow passages of the valve seat. Compression springs are provided between the valve guard and each shutter ring to oppose the movement of the shutter ring from the closed position, wherein the respective set of gas flow passages are closed.

Differential pressure across the valve causes automatic opening and closing of the valve. The crank shaft of reciprocating compressors using such valves can rotate at a rotary speed in the range of for example 100-1200 rpm and typically between 200 and 1000 rpm. The shutter rings are therefore subject to repeated opening and closing strokes at high speed. They are commonly made of composite material, such as short fiber-reinforced synthetic resin to reduce the mass thereof and thus the inertia. The valve seat and the valve guard are typically made of metal.

SUMMARY

According to a first aspect, the subject matter disclosed herein provides for an automatic ring valve system comprising a valve seat having gas flow passages arranged according to at least one annular row, and at least a shutter comprising at least a ring-shaped portion for selectively closing and opening the gas flow passages relative to an annular row. The valve system further comprises means, such as one or more resilient members, for contrasting the opening movement of the ring-shaped portion of the shutter from a closing position to an opening position. The ring-shaped portion of the shutter comprises a matrix or layer, for example made of synthetic polymeric resin material and reinforced with fibers, wherein the ring-shaped portion of the shutter comprises a structural core made by said fiber-reinforced matrix, and wherein at least a portion of said structural core is covered by at least one primary layer, designed to improve fracture and/or impact and/or wear resistance of said ring-shaped portion.

The idea is that of having a shutter or a shutter portion made of different parts, each specialized to guarantee particular mechanical resistance. The structural core provides the overall ring toughness, while the primary layer provides good damping and/or impact, and or fracture toughness and/or wear resistance.

In an embodiment, the primary layer is made with the same kind of matrix resin, but with different kind of fillers/fibers, such that the quantity and the type of the different fillers/fibers provides the different needed technical effect of the primary layer.

According to an embodiment the ring-shaped portion comprises at least one primary layer, designed to improve fracture and/or impact resistance of said ring-shaped portion, and at least an external layer, designed to improve in particular the wear resistance of the ring-shaped portion, arranged to cover or to surround the primary layer. The same external layer can decrease the friction coefficient with the parts the shutter is in contact with. In an embodiment, in this case, the external layer is made only by a polymeric resin without fillers or fibers, that can be the same resin as the primary layer, or other resin. In other cases, the external layer can include fillers/fibers adapted to increase wear resistance or reduce friction coefficient (e.g. copper oxide or organic nanoparticles).

In an embodiment, at least a primary layer is directly arranged on said structural core and said at least one external layer is directly arranged on said at least primary layer.

In some cases, the ring-shaped portion comprises only the structural core with only the primary layer that can encompass also fillers/fibers adapted to increase wear resistance or reduce friction coefficient.

As a matter of fact, the idea is that of having a core specialized to guarantee stiffness, a first layer directly in touch with the core specialized to guarantee impact resistance, and a second layer on the first layer specialized to guarantee wear resistance. In some cases, first and second layer are integrated together in a single layer.

In an embodiment, the least one ring-shaped portion comprises a concentric structure, wherein the structural core is surrounded by said primary layers; or a sandwich structure, wherein the structural core is comprised between two opposite primary layers lying on two correspondent planes orthogonal to the central axis of said at least one ring-shaped portion, or an overlapped structure, wherein only one primary layer is overlapped to a face of said structural core orthogonal to the central axis of said at least one ring-shaped portion, i.e. the structural core is protected only on one face.

In those embodiments, the external layer(s) can be located on the primary layer(s).

In some embodiments, concerning the structural core, at least some of the fibers of the structural core are continuous fibers and develop for at least 360° of the annular development of the ring-shaped portion of the shutter. Surprisingly, this configuration of ring-shaped portion of the shutter allows obtaining high buckling strength during opening/closing impacts and gives overall ring toughness.

Moreover, the use of continuous fibers allows a significant increase of the filler fraction of the ring-shaped portion of the shutter, i.e. the percentage of fibers in the ring-shaped portion of the shutter. Increased amounts of filler in the resin matrix in turn reduce the coefficient of thermal expansion of the ring-shaped portion of the shutter, thus substantially reducing the difference between the thermal expansion of the shutter and the thermal expansion coefficient of the valve seat and reduces the sensitivity of the valve efficiency to temperature changes.

According to some embodiments, the structural core is formed by pre-impregnated ("prepreg") composite continuous fibers.

In embodiments, the matrix of the structural core has a layered structure with layers including said continuous fibers.

In other exemplary embodiments, the matrix of the structural core is formed by wound portions of at least one elongated flexible element comprising said continuous fibers developing in the direction of the flexible element, wherein said wound portions are bonded together.

The flexible element comprises a polymeric resin and continuous fibers, with fibers arranged in and along the development of the flexible element.

An elongated flexible element can be "endless", or in the form of a tape, a tow, a strip, a rope, a line, a belt, a band, a ribbon etc. Said flexible element can comprise pre-impregnated composite continuous fibers.

According to some embodiments, the continuous fibers surround the central axis of said ring-shaped portion of the shutter.

In some embodiments, the continuous fibers are arranged according to a substantially helical development about the axis of the ring-shaped portion. According to other embodiments, the continuous fibers develop in a substantially spiral development about the center of said ring-shaped portion.

According to some exemplary embodiments the amount of the continuous fibers is comprised between 30% and 80% by weight on the total weight of the ring-shaped portion.

According to embodiments, the linear thermal expansion coefficient, in the same direction of the continuous fibers (in the case of a ring-shaped object, a circumferential direction) is comprised between $0.05 \times 10^{-6}/°$ C. and $10 \times 10^{-6}/°$ C.

The polymeric resin can be of the thermoplastic or thermoset type. In some embodiments, the polymeric resin is chosen from the group comprising Polyetheretherketone (PEEK), polyaryletherketones (PAEK), Polyphenylene Sulfide (PPS), Polysulfone (PSU), Polyphenylene Sulfide (PPS), Polyamide (PA), polyphthalamide (PPA), polyamide-imide (PAI), Polyethylene (PE), Polycarbonates (PC), Polyetherimide (PEI), polytetrafluoroethylene (PTFE), Polyimide (PI), polybenzimidazole (PBI), or epoxy resins.

In some embodiments, the continuous fibers are chosen from the group comprising glass fibers, E-glass fibers, ECR-glass fibers, S-glass fibers, carbon fibers, STD carbon fibers, IM carbon fibers, HM carbon fibers, UHM carbon fibers, aramid fibers.

In some embodiments, the least one primary layer comprises resin with filler embedded, wherein said resin is for example a polymeric resin, for example of the thermoplastic or thermoset type and filler.

In an embodiment, the polymeric resin of the primary layer is chosen from the group comprising Polyetheretherketone (PEEK), Polyaryletherketones (PAEK), Polyphenylene Sulfide (PPS), Polysulfone (PSU), Polyamide (PA), Polyphthalamide (PPA), Polyamide-Imide (PAI), Polyethylene (PE), Polycarbonates (PC), Polyetherimide (PEI), Polytetrafluoroethylene (PTFE), Polyimide (PI), Polybenzimidazole (PBI), or Epoxy Resins.

In an embodiment, in the primary layer the fillers are fibers, for example continuous and/or chopped fibers, for example chosen from the group comprising glass fibers, E-glass fibers, ECR-glass fibers, S-glass fibers, carbon fibers, STD carbon fibers, IM carbon fibers, HM carbon fibers, UHM carbon fibers, aramid fibers; for example the quantity of the fibers in the said at least one primary layer is comprised between 0% and 50% by weight on the total weight of the primary layer of the ring-shaped portion.

In an embodiment, the fillers can comprise or also be chosen from the group comprising: nanoparticles e.g. $Al_2O_3$ (Alumina), $Si_3N_4$ (Silicon Nitride), $SiO_2$ (Silicon Dioxide), $CaCO_3$ (Calcium carbonate), CuO (Copper oxide), $Fe_3O_4$ (magnetite), $WS_2$ (tungstenite), and/or Nanotubes e.g Single Wall Carbon Nanotube (SWCN), Multi-Wall Carbon Nanotube (MWCN), Carbon Nanofiber (CNF), and/or Nanoclay e.g. montmorillonite;

In an embodiment the amount of the fillers in the said primary layer is comprised between 0% and 10% by weight on the total weight of the primary layer of the ring-shaped portion; if the fillers is $Fe_3O_4$ (magnetite), the quantity of the filler in the at least one primary layer is comprised between 0% and 55% by weight on the total weight of the primary layer of the ring-shaped portion.

In some embodiments, the external layer comprises resin with filler embedded, wherein said resin is for example a polymeric resin, for example of the thermoplastic or thermoset type and filler.

In an embodiment, the polymeric resin of the external layer is chosen from the group comprising Polyetheretherketone (PEEK), Polyaryletherketones (PAEK), Polyphenylene Sulfide (PPS), Polysulfone (PSU), Polyamide (PA), Polyphthalamide (PPA), Polyamide-Imide (PAI), Polyethylene (PE), Polycarbonates (PC), Polyetherimide (PEI), Polytetrafluoroethylene (PTFE), Polyimide (PI), Polybenzimidazole (PBI), or Epoxy Resins.

In an embodiment, in the external layer the fillers are fibers, for example continuous and/or chopped fibers, for example chosen from the group comprising glass fibers, E-glass fibers, ECR-glass fibers, S-glass fibers, carbon fibers, STD carbon fibers, IM carbon fibers, HM carbon fibers, UHM carbon fibers, aramid fibers; for example the quantity of the fibers in the said external layer is comprised between 0% and 50% by weight on the total weight of the external layer of the ring-shaped portion.

In an embodiment, the fillers can comprise or also be chosen from the group comprising: nanoparticles e.g. $Al_2O_3$ (Alumina), $Si_3N_4$ (Silicon Nitride), $SiO_2$ (Silicon Dioxide), $CaCO_3$ (Calcium carbonate), CuO (Copper oxide), $Fe_3O_4$ (magnetite), $WS_2$ (tungstenite), and/or Nanotubes e.g Single Wall Carbon Nanotube (SWCN), Multi-Wall Carbon Nanotube (MWCN), Carbon Nanofiber (CNF), and/or Nanoclay e.g. montmorillonite;

In an embodiment the amount of the fillers in the said external layer is comprised between 0% and 10% by weight on the total weight of the external layer of the ring-shaped portion; if the fillers is $Fe_3O_4$ (magnetite), the quantity of the filler in the external layer is comprised between 0% and 55% by weight on the total weight of the external layer of the ring-shaped portion.

In other embodiments, as said before, the at least one external layer is deprived of fillers or fibers, and comprises only resin of the type chosen from the group comprising Polyetheretherketone (PEEK), Polyaryletherketones (PAEK), Polyphenylene Sulfide (PPS), Polysulfone (PSU), Polyamide (PA), Polyphthalamide (PPA), Polyamide-Imide (PAI), Polyethylene (PE), Polycarbonates (PC), Polyetherimide (PEI), Polytetrafluoroethylene (PTFE), Polyimide (PI), Polybenzimidazole (PBI), or Epoxy Resins.

In an embodiment, the shutter can be made of single concentrical rings separated one from the other.

According to other embodiments, the shutter can be made in one piece and comprises a plurality of coaxially arranged ring-shaped portions connected to one another by one or more transversal portions.

The new structure of the valve shutter according to an embodiment of the invention increases durability of the shutter in comparison with the valves plastic rings of the known type, improving impact resistance and stiffness.

According to a second aspect, the subject matter disclosed herein provides for a shutter for an automatic ring valve according to one or more of the preceding embodiments mentioned above. According to some embodiments, the shutter is in form of a ring adapted for closing/opening a relative annular row of gas flow passages arranged in the valve seat of the automatic ring valve; according another point of view, the shutter can be made of single concentrical independent rings (therefore each ring is a ring-shaped portion of the shutter). According to other embodiments, the shutter comprises a plurality of coaxial a ring-shaped portions joined together forming a one-piece body for closing/opening the gas flow passages arranged in annular rows in the valve seat.

According to a third aspect, the subject matter disclosed herein provides for the use of a ring-shaped portion body according to one or more of the preceding embodiments provided above, as a shutter or a portion of shutter of an automatic ring valve.

According to a fourth aspect, the subject matter disclosed herein provides for a method for manufacturing a shutter or a shutter portion for an automatic ring valve, comprising the steps of producing a structural core, having a ring or circular-shape, comprising a matrix with polymeric resin and fibers, producing, on said structural core, at least a primary layer comprising a polymeric resin and fibers, forming a ring or circular-shape one-piece product comprising said structural core and said at least a primary layer, machining the said one-piece product to form the shutter or shutter portion.

In an embodiment, the step of producing the at least a primary layer on said structural core comprising the steps of compression moulding said at least a primary layer on the existing structural core, or injection moulding said at least a primary layer on the existing structural core, or spray or bath coating said at least a primary layer on the existing structural core.

In an embodiment, the method comprises the step of producing, before said machining step, an external layer on said at least a primary layer, comprising a polymeric resin with or without fillers or fibers, forming a ring or circular-shape one-piece product comprising structural core, at least a primary layer and said external layer.

In an embodiment, the step of producing the external layer on said at least a primary layer comprises the step of compression moulding said external layer on the existing primary layer, or injection moulding said external layer on the existing primary layer, or spray or bath coating said external layer on the existing primary layer.

In an embodiment, the step of producing said structural core comprises the steps of winding at least one elongated flexible element comprising a polymeric resin and continuous fibers, with fibers arranged in and along the flexible element, on and around a cylindrical structure, such that a substantially cylindrical multilayers configuration is formed; bonding the layers of said at least one flexible element to form an intermediate one-piece product having a broadly cylindrical shape; cutting at least one ring-shaped portion from a part of said intermediate one piece product.

This method allows providing shutters for automatic ring valve in an economic manner and with increased mechanical properties.

As stated above, the flexible element comprises a polymeric resin and continuous fibers, with fibers arranged in and along the development of the flexible element. An flexible element can be "endless" or in the form of a tape, a tow, a strip, a rope, a line, a belt, a band, a ribbon etc. The flexible element can comprise pre-impregnated composite continuous fibers.

The structural core can be cut or machined out from the intermediate one-piece product, for example, by conventional or not conventional machining, such as turning, boring, drilling, milling, laser cutting, water jet cutting or the like.

The ring-shaped portion can be cut or machined out from the one-piece product, for example, by conventional or not conventional machining, such as turning, boring, drilling, milling, laser cutting, water jet cutting or the like.

According to some embodiments, the one-piece product is divided into annular slices and then said at least one ring-shaped portion is cut from an annular slice.

One or more rings of a shutter can be obtained from a single annular slice.

According to some embodiments, the intermediate one-piece product is divided into annular slices and then said structural core is cut from an annular slice.

One or more structural cores can be obtained from a single annular slice.

According to other embodiments, the one-piece product is divided into annular slices and then the shutter is formed by making through holes, for example slots or elongated holes through an annular slice such that the shutter is made in one piece and comprises a coaxial plurality of ring-shaped portions and a plurality of transversal portions joining together the ring-shaped portions. As an example, the silhouette of the one piece shutter between the external and internal ring-shaped portions can be complementary to the silhouette of relative part of the valve plate.

According to other embodiments, the intermediate one-piece product is divided into annular slices and then the structural core is formed by making through holes, for example slots or elongated holes through an annular slice such that the structural core is made in one piece and comprises a coaxial plurality of ring-shaped portions and a plurality of transversal portions joining together the ring-shaped portions. As an example, the silhouette of the one piece structural core between the external and internal ring-shaped portions can be complementary to the silhouette of relative part of the valve plate.

According to some embodiments, said at least one flexible element is wound helicoidally around and along the axis of the cylindrical structure. Therefore, the flexible element moves relative to the cylindrical structure (or vice-versa) with rotation and translation parallel to the axis.

According to embodiments of the disclosure, the at least one flexible element is wound in a substantially inclined manner with respect to the axis of the cylindrical structure.

According to some embodiments, the at least one flexible element is wound around said cylindrical structure according to automated fiber placement (AFP) technique. This technique provides for winding on a mandrel a plurality of flexible element (with continuous filaments embedded in a polymeric matrix) helicoidally around and along the axis of the mandrel (or bar).

In other exemplary embodiments, the at least one flexible element is wound spirally around the axis of the cylindrical structure. Therefore, in this case, the flexible element moves relative to the cylindrical structure (or vice-versa) only with rotation around the axis.

According to some embodiments, the at least one flexible element is wound in a substantially orthogonal manner with respect to the axis of the cylindrical structure.

In other exemplary embodiments, the at least one flexible element is a tape wound around said cylindrical structure according to automated tape laying (ATL) technique. This technique provides for winding on a mandrel a single tape (with continuous filaments embedded in a polymeric matrix) such that at every winding round the new tape portion overlaps the underlying tape portion with constant width (the tape has a lay up of 90° with respect to the winding axis).

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of an embodiment of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof may be obtained as the same becomes better understood by reference to the following detailed description when considered in connection with the accompanying drawings, wherein:

FIG. 2 illustrates the head of a reciprocating compressor using four automatic ring valves as the one shown in FIG. 1;

FIG. 5 illustrates a schematic sectional view, on a diameter plane, of a portion of the shutter ring for an automatic ring valve according to a first embodiment of the present disclosure;

FIG. 6 illustrates a schematic sectional view, on a diameter plane, of a portion of the shutter ring for an automatic ring valve according to a second embodiment of the present disclosure;

FIG. 7 illustrates a schematic sectional view, on a diameter plane, of a portion of the shutter ring for an automatic ring valve according to a third embodiment of the present disclosure;

FIG. 8 illustrates a schematic sectional view, on a diameter plane, of a portion of the shutter ring for an automatic ring valve according to a fourth embodiment of the present disclosure;

FIG. 9 illustrates a schematic sectional view, on a diameter plane, of a portion of the shutter ring for an automatic ring valve according to a fifth embodiment of the present disclosure;

FIG. 10 illustrates a schematic sectional view, on a diameter plane, of a portion of the shutter ring for an automatic ring valve according to a sixth embodiment of the present disclosure;

FIG. 13 illustrates another schematic transversal view of an intermediate annular product, similar to that of FIG. 11, of a method for manufacturing a shutter ring according to some embodiments of the present disclosure;

FIG. 14 illustrates an assonometric schematic view of a portion of structural core of the shutter ring cut off from the intermediate annular product of FIG. 13;

FIG. 15 illustrates a plan schematic view of a structural core of the shutter ring cut off from the intermediate annular product of FIG. 13.

DETAILED DESCRIPTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 1:
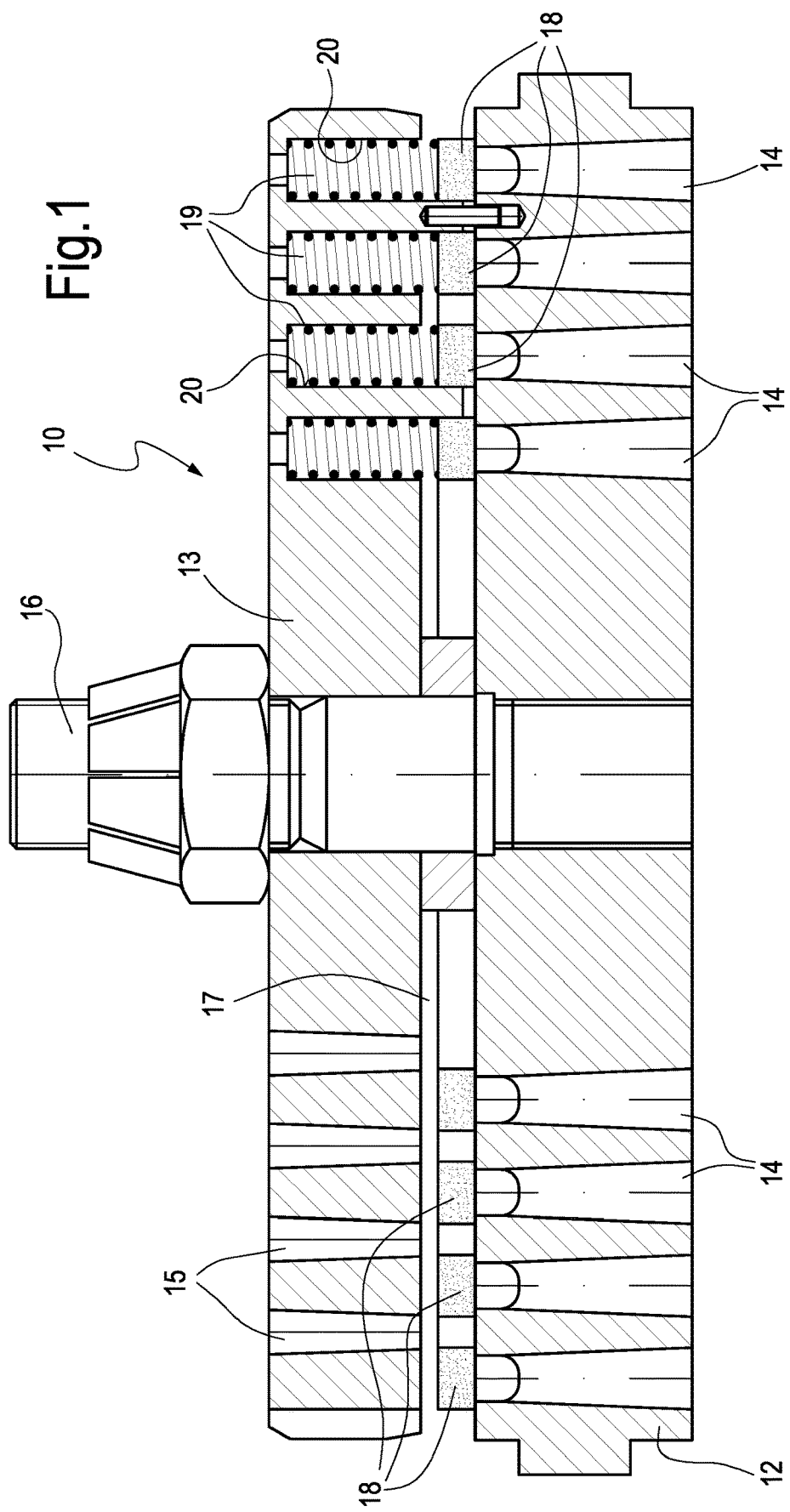
FIG. 1 illustrates a section view of an automatic ring valve according to an embodiment of the invention.

An exemplary embodiment of an automatic ring valve is illustrated in FIG. 1. The automatic ring valve 10 comprises a valve seat 12 and a valve guard 13. The valve seat is provided with circumferentially arranged gas flow passages 14 extending through the valve seat 12. The valve guard 13 is in turn provided with gas flow passages 15. A central screw 16 connects the valve seat 12 and the valve guard 13 to one another leaving a space 17 there between. A plurality of concentrically arranged shutter rings 18 is provided between the valve seat 12 and the valve guard 13. Each shutter ring 18 is arranged along a set of corresponding annularly arranged gas flow passages 14 of the valve seat 12. A plurality of contrasting members for contrasting an opening movement of the shutter rings 18 are provided; as an example, these members consist of a plurality of resilient members, as compression springs 19, for each shutter ring 18 for biasing the shutter ring 18 in a closed position, wherein the shutter ring 18 closes the respective set of gas flow passages 14 by sealingly contacting corresponding sealing surfaces of the gas flow passages 14. The compression springs 19 are housed in respective spring pockets 20 provided in the valve guard 13.

Differential pressure across the valve 10 causes automatic opening and closing of the valve. FIG. 2 illustrates the head 21 of a reciprocating compressor using four automatic ring valves 10 arranged on the suction ports and discharge ports of the compressor and designated 10A, 10B, 10C, 10D.

More in detail, the compressor head 21 defines a compressor cylinder 23 wherein a piston 24 is reciprocatingly movable. A rod 25 of the piston 24 is connected to a crank (not shown), which reciprocatingly moves the piston 24 according to double arrow f24. The piston 24 divides the cylinder 23 into two separate compression chambers 23A, 23B.

The compressor head 21 is provided with a first suction port 27 in fluid communication with the first compression chamber 23A through a first automatic ring valve 10A. A second suction port 29 is in fluid communication with the second compression chamber 23B through a second automatic ring valve 10B. A first discharge port 31 is in fluid communication with the first compression chamber 23A through a third automatic ring valve 10C and a second discharge port 33 is in fluid communication with the second compression chamber 23B through a fourth automatic ring valve 10D.

The reciprocating motion of the piston 24 causes selectively suction of the gas in the first compression chamber 23A and discharge of compressed gas from the second compression chamber 23B and vice versa. The automatic ring valves 10A, 10B, 10C and 10D selectively open when the pressure in the first gas flow passages 14 exceeds the resilient force of the springs 19.

The crank shaft of reciprocating compressors can rotate at a rotary speed in the range of for example 100-1200 rpm and typically between 200 and 1000 rpm. The shutter rings 18 are therefore subject to repeated opening and closing strokes at high speed. The valve seat 12 and the valve guard 13 are, as an example, made of metal.

Each shutter ring 18 comprises a structural core 18A made by a fiber-reinforced matrix 40, described below, in order to reduce the inertia of the moving shutter.

As better described below, according to an embodiment of the invention, at least a portion of said structural core 18A is covered by at least one primary layer 18B, and if needed, an external layer 18C, designed to improve fracture and/or impact and/or wear resistance of said ring-shaped portion.

In an embodiment, in embodiments, the fibers of the fiber-reinforced matrix are continuous fibers 41, and at least a group of them develops for at least 360° of the annular development of the ring. In an embodiment almost the totality of the fibers are continuous fibers developing for more than 360° of the annular development of the ring.

Figure 11:
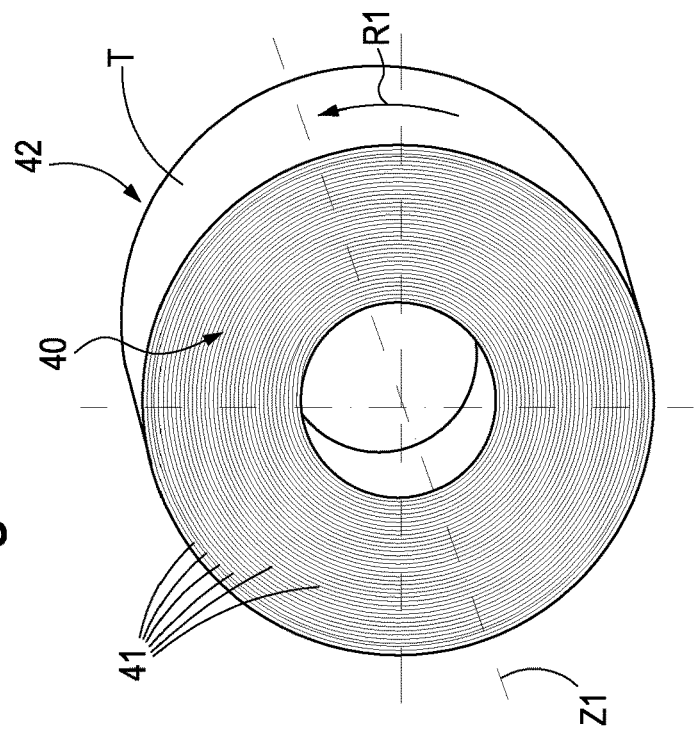
FIG. 11 illustrates a schematic transversal view of an intermediate annular product of a method for manufacturing a shutter ring or a shutter according to some embodiments of the present disclosure.

Practically speaking, the continuous fibers 41 of the structural core 18A surround the central axis Z1 of said shutter ring 18. A schematic sectional diameter views of a shutter ring 18 are shown in FIGS. 5-14, wherein continuous fibers 41 are depicted by little dots (FIG. 5-10) or concentric circles (FIG. 11, 12, 14, 15).

In other embodiments, the fibers can be chopped fibers and not continuous fibers. Other kind of fiber can be used.

According to some embodiments, the matrix 40 comprises a polymeric resin wherein the fibers 41 (continuous or not) are embedded. In an embodiment, the polymeric resin is Polyetheretherketone (PEEK), that is a thermoplastic resin.

Other kind of polymeric resin can be chosen, as an example, from the group comprising Polyetheretherketone (PEEK), polyaryletherketones (PAEK), Polyphenylene Sulfide (PPS), Polysulfone (PSU), Polyphenylene Sulfide (PPS), Polyamide (PA), polyphthalamide (PPA), polyamide-imide (PAI), Polyethylene (PE), Polycarbonates (PE), Polyetherimide (PEI), polytetrafluoroethylene (PTFE), Polyimide (PI), polybenzimidazole (PBI), or epoxy resins.

The resin can be also of the thermoset type.

In an embodiment, the fibers 41 (continuous or chopped or other fibers) are chosen from the group comprising glass fibers, E-glass fibers, ECR-glass fibers, S-glass fibers, carbon fibers, STD carbon fibers, IM carbon fibers, HM carbon fibers, UHM carbon fibers, aramid fibers.

In an embodiment, the quantity of the fibers in the structural core 18A is comprised between 30% and 80% by weight on the total weight of the structural core of the ring-shaped portion.

According to embodiments, the linear thermal expansion coefficient, in the same direction of the fibers (in the case of a ring-shaped object, a circumferential direction), of the structural core is comprised between $0.05 \times 10^{-6}/°$ C. and $10 \times 10^{-6}/°$ C.

As an example, with a matrix resin made by PEEK with 68% by weight of continuous carbon fibers embedded, the linear thermal expansion coefficient is $0.27 \times 10^{-6}/°$ C.

The use of continuous fibers allows the increase of the filler fraction in the ring material, with reduction of the differential of the coefficient of expansion, in absolute value, of the valve seat material and of the shutter ring material and, at the same time, a surprising increase of the buckling strength of the shutter during opening/closing impacts, with clear benefits in terms of durability and toughness of the shutter and in terms of reliability of the sealing of valve.

In an embodiment, the matrix of the of the structural core 18A has a layered structure with layers including said fibers (continuous or chopped or other kind of fibers). The matrix can be formed by wound portions of flexible element, as a tape T (or other kind of flexible elements as defined above) comprising the continuous fibers 41 developing in the direction of the flexible element. The wound portions are bonded together forming the structure of the shutter. In case of thermoplastic resin, the bonding action can be a thermo-bonding action.

Considering the embodiments with continuous fibers in the structural core 18A, in FIG. 11 is shown an annular piece 42, with cylindrical shape, made of a wound tape with a lay up of 90°—arrow R1—(that means that, at every winding round, the new tape portion overlaps the underlying tape portion with constant width; the tape has a lay up of 90° with respect to the winding axis Z1). The tape is formed as the matrix 40, that is a polymeric structure wherein the continuous fibers are embedded, developing in the direction of the tape.

Practically speaking, the continuous fibers overlaps according to a substantially orthogonal direction with respect to the axis Z1 of the intermediate annular piece 42 (the projection of a continuous fiber develops in a plane orthogonal to the axis Z1 of the piece 42).

According to this configuration, the continuous fibers 41 develop in a substantially spiral development about the center/axis of the piece 42.

From this intermediate annular piece 42, a ring forming the structural core 18A can be cut off (see FIG. 13, wherein the shape of a ring 18A is depicted, by an hidden line, inside the longitudinal sectional view of a portion of annular piece 42; in FIG. 14, the portion of the structural core 18A cut off by the intermediate annular piece 42, is shown).

The cutting off is useful to guarantee the correct dimensional tolerance to the structural core. It is clear that in other example, a structural core 18A can be manufactured directly winding, on a mandrel with diameter equal to the internal diameter of the ring 18A, a tape with a width equal to the height (dimension parallel to the axis) of the ring 18A, until the external diameter of the wound tape is equal to the external diameter of the ring. The cutting off is in an example made in such a way that the continuous fibers develop in a substantially orthogonal development with respect to the axis Z1 of the structural core 18A (a continuous fiber develops in a plane orthogonal to the axis of the ring 18A).

Figure 12:
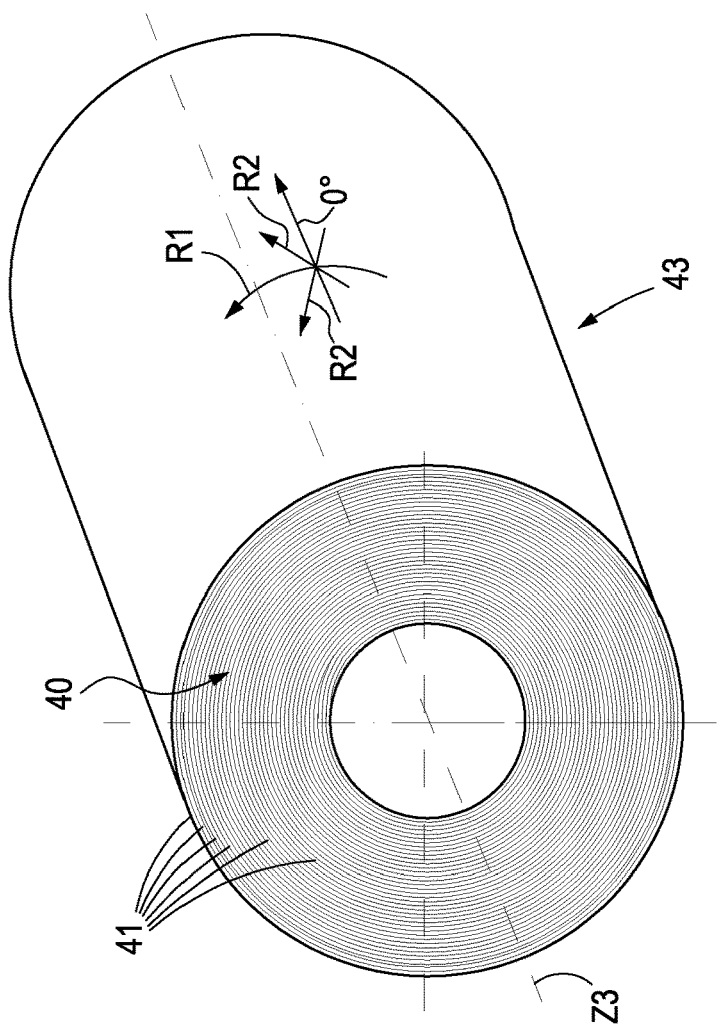
FIG. 12 illustrates another schematic transversal view of an intermediate annular product of a method for manufacturing a shutter ring or a shutter according to some embodiments of the present disclosure.

In FIG. 12 is shown a further annular piece 43, with cylindrical shape, like an annular billet, having an height longer than the height of the annular piece 42 of FIG. 5. In this case, the further annular piece 43 can be made of a wound tape with a lay up of 90° with width greater than the width of the tape of the case of FIG. 11.

Alternatively, the further annular piece 43 can be made of a wound flexible element with a lay up different from 90°, with width similar to the width of the tape of the case of FIG. 5. That means that the continuous fibers develop in a substantially helical development about the axis Z3 (the winding axis) of further annular piece 43. Practically speaking, the continuous fibers develop in a substantially inclined development (e.g. 45° from the axis direction 0°) with respect to the axis Z3 of annular piece 43 (arrow R2).

In this latter case, multiple flexible elements can be used, with same or inclined development with respect to the axis Z3 can be used.

In other examples, in place of one or more tapes, one or more prepreg composite tows can be used, wherein the polymeric resin used for impregnating the continuous fibers, as such the fibers, can be of the same type of the tape solutions.

As said before, according to an embodiment of the invention, at least a portion of the structural core 18A is covered by at least one primary layer 18B, designed to improve fracture and/or impact and/or wear resistance of said ring-shaped portion.

The idea is that of having a shutter or a shutter portion made of different parts, each specialized to guarantee particular mechanical resistance.

In an embodiment, the primary layer 18B is made with the same kind of matrix resin of the structural core 18A, but with different kind of fillers/fibers, such that the quantity and the type of the different fillers/fibers provides the different needed technical effect of the primary layer.

In FIG. 5 an embodiment of portion of shutter is shown, wherein the structural core 18A is surrounded by a primary layer 18B, forming a concentric structure.

In FIG. 7 an embodiment of portion of shutter is shown, wherein the structural core 18A is comprised between two opposite primary layers 18B, like a sandwich structure, wherein the two opposite primary layers lie on two correspondent planes orthogonal to the central axis Z the one ring-shaped portion 18.

In FIG. 9 an embodiment of portion of shutter is shown, wherein only one primary layer 18B is overlapped to a face of said structural core 18A orthogonal to the central axis Z of the ring-shaped portion 18, i.e. the structural core 18A is protected only on one face.

In FIGS. 6, 8 and 10, the ring-shaped portion 18 comprises the structural core 18A, one (or more) primary layer 18B, designed to improve fracture and/or impact resistance of said ring-shaped portion, and one external layer 18C, designed to improve in particular the wear resistance of the ring-shaped portion, arranged to cover or to surround the primary layer 18B.

The external layer 18C can decrease the friction coefficient with the parts the shutter is in contact with. In an embodiment, in this case, the external layer 18C is made only by a polymeric resin without fillers or fibers, that can be the same resin as the primary layer 18B, that can be the same resin of structural core 18A, or other resin.

In other cases, the external layer 18C can include fillers/fibers adapted to increase wear resistance or reduce friction coefficient (e.g. copper oxide or organic nanoparticles).

The primary layer 18B is directly arranged on the structural core 18A the external layer 18C is directly arranged on the primary layer 18B.

In particular, in FIG. 6 is shown the structural core 18A surrounded by the primary layer 18B and by the external layer 18C, forming a concentric structure.

In FIG. 8 is shown a sandwich structure wherein external layer 18C and primary layer 18B are located on opposite faces of the structural core 18A.

In FIG. 10 the primary layer 18B and the external layer 18C are overlapped to only a face of said structural core 18A orthogonal to the central axis Z of the ring-shaped portion 18.

In some cases, the ring-shaped portion comprises only the structural core 18A with only the primary layer 18B that can encompass also fillers/fibers adapted to increase wear resistance or reduce friction coefficient (as external layer).

Again, the core 18A is specialized to guarantee stiffness, the first layer 18B directly in touch with the core is specialized to guarantee impact resistance, and a second layer 18C on the first layer is specialized to guarantee wear resistance. In some cases, first and second layer are integrated together in a single layer.

As said before, the primary layer 18B comprises resin with filler embedded, wherein the resin is for example a polymeric resin, for example of the thermoplastic or thermoset type and filler.

The polymeric resin of the primary layer 18B, or of the external layer 18C, is chosen from the group comprising Polyetheretherketone (PEEK), Polyaryletherketones (PARK), Polyphenylene Sulfide (PPS), Polysulfone (PSU), Polyamide (PA), Polyphthalamide (PPA), Polyamide-Imide (PAI), Polyethylene (PE), Polycarbonates (PC), Polyetherimide (PEI), Polytetrafluoroethylene (PTFE), Polyimide (PI), Polybenzimidazole (PBI), or Epoxy Resins.

In the primary layer 18B or in the external layer 18C, the fillers are fibers, for example continuous and/or chopped fibers, for example chosen from the group comprising glass fibers, E-glass fibers, ECR-glass fibers, S-glass fibers, carbon fibers, STD carbon fibers, IM carbon fibers, HM carbon fibers, UHM carbon fibers, aramid fibers; for example the quantity of the fibers in the said at least one primary layer or external layer is comprised between 0% and 50% by weight on the total weight of the primary layer or external layer of the ring-shaped portion.

The fillers in the layers can also comprises nanoparticles e.g. $Al_2O_3$ (Alumina), $SiO_2$ (Silicon Dioxide), $Si_3N_4$ (Silicon Nitride) $CaCO_3$ (Calcium carbonate), $Fe_3O_4$ (magnetite), CuO (Copper oxide), $WS_2$ (tungstenite), and/or Nanotubes e.g Single Wall Carbon Nanotube (SWCN), Multi-Wall Carbon Nanotube (MWCN), Carbon Nanofiber (CNF), and/or Nanoclay e.g. montmorillonite.

In an embodiment the amount of the fillers in the primary layer 18B is comprised between 0% and 10% by weight on the total weight of the primary layer ring-shaped portion; if the fillers is $Fe_3O_4$ (magnetite), the quantity of the filler in the primary layer 18B is comprised between 0% and 55% by weight on the total weight of the primary layer of the ring-shaped portion.

In an embodiment, the possible combinations of layers and material forming the layers are many. In the following, two specific but not limiting examples comprising both primary layer and external layer are given.

Example 1

Structural core comprising Polyphenylene Sulfide (PPS) with glass fibers comprised between 53% and 57% by weight on the total weight of the structural core, primary layer comprising Polyphenylene Sulfide (PPS) with fillers comprising tungstenite ($WS_2$) comprised between 0.7% and 1.3% by weight on the total weight of the primary layer, external layer comprising Polyphenylene Sulfide (PPS) with fillers comprising CuO (Copper oxide) comprised between 1.7% and 2.3% by weight on the total weight of the external layer.

Example 2

Structural core comprising Polyetheretherketone (PEEK) with continuous carbon fibers comprised between 57% and 63% by weight on the total weight of the structural core, primary layer comprising Polyetheretherketone (PEEK) with fillers comprising $Al_2O_3$ (Alumina) comprised between 4.7% and 5.3% by weight on the total weight of the primary layer, external layer comprising Polyphenylene Sulfide (PPS) with fillers comprising $Si_3N_4$ (Silicon Nitride) comprised between 2.7% and 3.3% by weight on the total weight of the external layer.

Figure 4:
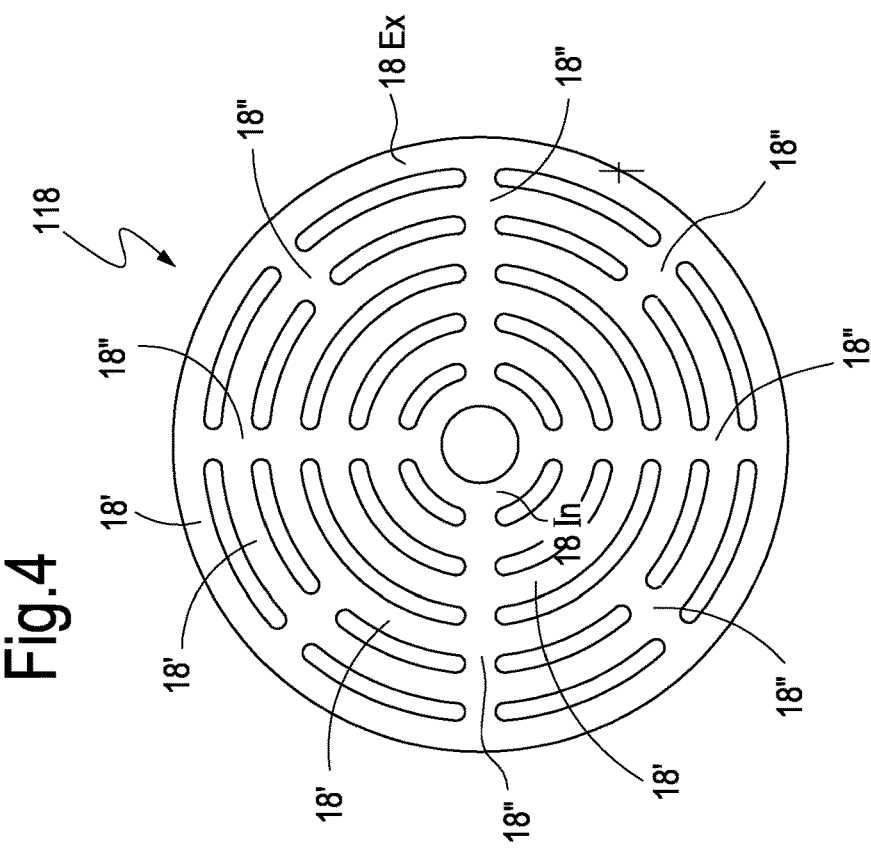
FIG. 4 illustrates a plan view of a shutter ring for an automatic ring valve according to other embodiments, different from the ones of FIG. 3, of the present disclosure.
Figure 3:
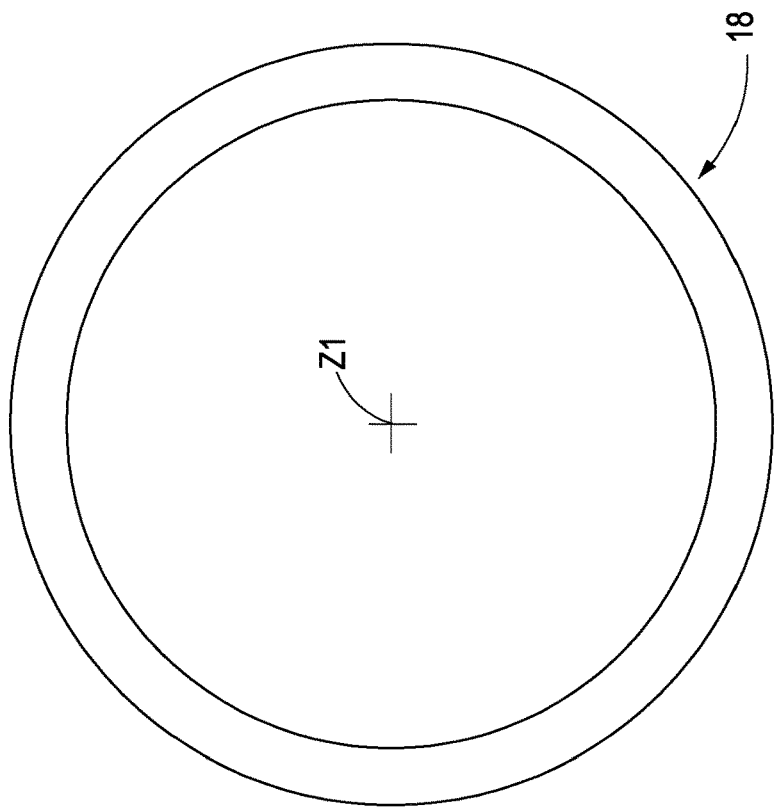
FIG. 3 illustrates a plan view of a shutter ring for an automatic ring valve according to some embodiments of the present disclosure.

In FIG. 4, a different valve shutter 118 is shown. In this case, the shutter 118 is made in one piece of concentric ring-shaped portions 18 joined together by transversal portions 18A. In an embodiment, those transversal portions 18A are provided along radial direction of the ring portions 18.

A method for manufacturing a shutter or a shutter portion for an automatic ring valve, according to an embodiment of the invention, comprises the steps of producing a structural core 18A, having a ring or circular-shape, comprising a polymeric resin and fibers, producing, on said structural core, at least a primary layer 18B comprising a polymeric resin and fibers, forming a ring or circular-shape one-piece product comprising said structural core 18A and said at least a primary layer 18B, machining the said one-piece product to form the shutter or shutter portion 18.

A method for manufacturing the structural core 18A of a for an automatic ring valve according to what said before, comprises the steps of winding at least one flexible element T comprising a polymeric resin and continuous fibers 41, with fibers arranged in and along the flexible element T, on and around a cylindrical structure, such that a substantially cylindrical multilayers configuration is formed, bonding the layers of said at least one flexible element to form an intermediate one-piece product having a broadly cylindrical shape, cutting the structural core 18A from a part of said intermediate one piece product.

The cutting off of the structural core 18A can be made, for example, by conventional or not conventional machining, as turning, boring, drilling, milling, laser cutting, water jet cutting etc.

Considering the case of the intermediate one piece product in the form of an annular billet 43, the latter can be divided into annular slices (similar to the annular body 42) and then the structural core 18A is cut off from one annular slice as stated before at point (c).

From one annular slice can be provided one or more structural cores.

In the case of a shutter 118 as shown in FIG. 4, the intermediate one piece product 42 (or a slice of the annular billet 43) is cut off by making through holes, for example slots or elongated holes, through the thickness of the piece (axial direction), such that the structural core 118A is comprised of a coaxial plurality of ring-shaped portions 18' and a plurality of transversal portions 18" joining together the ring-shaped portions 18'. The silhouette of the structural core 118A between the external and internal ring-shaped portions 18Ex and 18In can be complementary to the silhouette of relative part of the valve plate.

As said before, one or more "endless" or elongated flexible elements can be wound helicoidally around and along the axis Z3 of the cylindrical structure (the annular billet 43). Therefore, the flexible elements move relative to the cylindrical structure (or vice-versa) with rotation and translation parallel to the axis Z3. That means that the flexible elements are wound in a substantially inclined manner with respect to the axis Z3 of the cylindrical structure 43. As an examples, one or more tows are wound around said cylindrical structure according to automated fiber placement (AFP) technique.

In other exemplary embodiments of the method, one or more flexible elements are wound spirally around the axis Z1 of the cylindrical structure 42 to 43. Therefore, in this case, the flexible elements move relative to the cylindrical structure (or vice-versa) only with rotation around the axis Z1. Therefore the flexible elements are wound in a substantially orthogonal manner with respect to the axis of the cylindrical structure 42, 43. As an example, one tape is wound around said cylindrical structure according to automated tape laying (ATL) technique.

In an embodiment, the step of producing the at least a primary layer 18B on said structural core 18A comprises the steps of compression moulding the primary layer 18B on the existing structural core 18A, or injection moulding the primary layer on the existing structural core, or spray or bath coating the primary layer on the existing structural core.

In an embodiment, the method comprises the step of producing, before said machining step, an external layer 18C on the primary layer 18B, comprising a polymeric resin without fillers or fibers, forming a ring or circular-shape one-piece product comprising structural core 18A, primary layer 18B and said external layer 18C.

Again, the step of producing the external layer can comprises the step of compression moulding the external layer 18C on the existing primary layer 18B, or injection moulding said external layer on the existing primary layer, or spray or bath coating said external layer on the existing primary layer.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions.

In addition, the order or sequence of any process or method steps may be varied or re-sequenced according to alternative embodiments.

What is claimed is:

1. An automatic ring valve comprising:
   a valve seat comprising a plurality of gas flow passages arranged in at least one annular row;
   at least one shutter comprising at least one ring-shaped portion to selectively open and close the gas flow passages, the ring-shaped portion comprising a structural core, at least a portion of the structural core is made of a fiber-reinforced matrix of continuous fibers, at least some of the continuous fibers developing for at least 360° in a substantially helical development about an axis of the ring-shaped portion, and at least a portion of the structural core is covered by at least one primary layer to improve fracture and/or impact and/or wear resistance of the ring-shaped portion; and
   at least one contrasting member to contrast an opening movement of the ring-shaped portion of the shutter.

2. The automatic ring valve according to claim 1, wherein the at least one ring-shaped portion comprises at least one of:
   a concentric structure, wherein the structural core is entirely surrounded by the primary layer;
   a sandwich structure, wherein the structural core is arranged between two opposite protecting layers lying on two opposite surfaces of the structural core, the surfaces orthogonal to a central axis of the at least one ring-shaped portion; or
   an overlapped structure, wherein the primary layer is arranged to cover only a face of the structural core orthogonal to the central axis of the at least one ring-shaped portion.

3. The automatic ring valve according to claim 1, wherein the ring-shaped portion comprises the at least one primary layer to improve fracture resistance and/or impact resistance of the ring-shaped portion, and at least an external layer to improve wear resistance of the ring-shaped portion and cover or surround the at least one primary layer, the primary layer being arranged between the external layer and the structural core.

4. The automatic ring valve according to claim 3, wherein the at least one primary layer is directly arranged on the structural core and the at least one external layer is directly arranged on the at least primary layer.

5. The automatic ring valve according to claim 1, wherein the matrix forming the structural core has a layered structure.

6. The automatic ring valve according to claim 1, wherein the fiber-reinforced matrix of the structural core is formed by wound portions of at least one flexible element comprising the continuous fibers, the wound portions being bonded together.

7. The automatic ring valve according to claim 1, wherein the axis is a central axis of the ring-shaped portion of the at least one shutter.

8. The automatic ring valve according to claim 1, wherein the continuous fibers are arranged in a substantially inclined development with respect to the axis of the ring-shaped portion.

9. The automatic ring valve according to claim 1, wherein the continuous fibers overlap in a substantially orthogonal direction with respect to the axis of the ring-shaped portion.

10. The automatic ring valve according to claim 1, wherein the at least one shutter is made of single concentrical rings separated one from the other.

11. The automatic ring valve according to claim 1, wherein the at least one shutter is made in one piece and comprises a plurality of coaxially arranged ring-shaped portions and a plurality of transversal connections joining the ring-shaped portions to one another.

* * * * *